Figure 4:
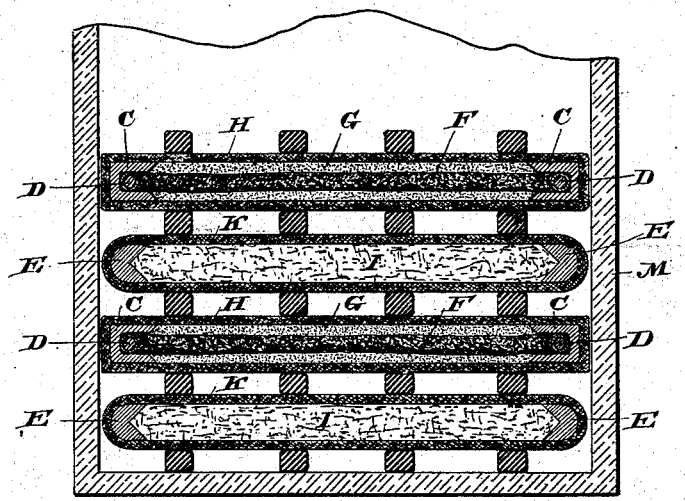

(No Model.)  2 Sheets—Sheet 1.
A. TRIBE.
SECONDARY BATTERY.
No. 284,343.  Patented Sept. 4, 1883.
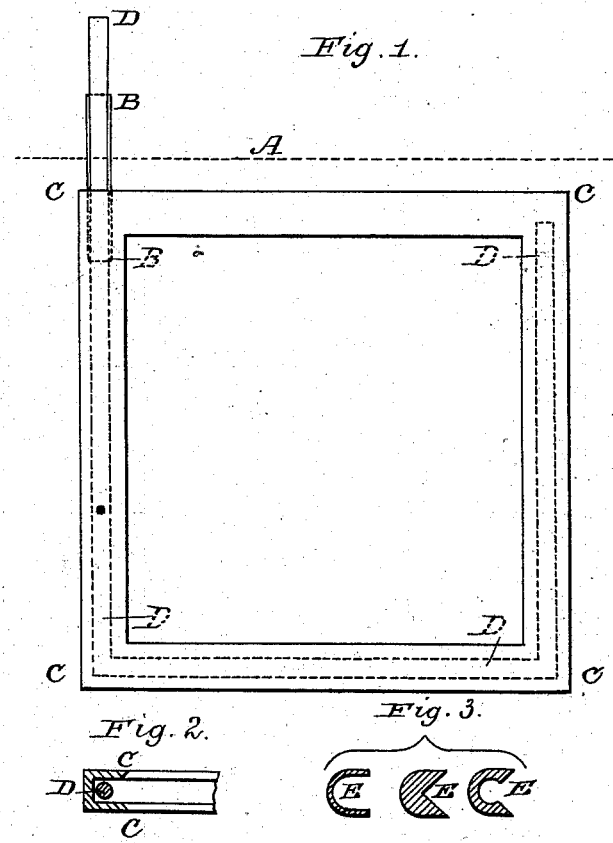
Witnesses:
C. J. Hedrick
Philip Mauro
Inventor:
Alfred Tribe by
A. Pollok
his attorney.

(No Model.) 2 Sheets—Sheet 2.

A. TRIBE.
SECONDARY BATTERY.

No. 284,343. Patented Sept. 4, 1883.

Witnesses:
C. J. Hedrick
Philip Mauro

Inventor:
Alfred Tribe
by
A. Pollok
his attorney

UNITED STATES PATENT OFFICE.

ALFRED TRIBE, OF DENBIGH ROAD, NOTTING-HILL, COUNTY OF MIDDLESEX, ENGLAND.

SECONDARY BATTERY.

SPECIFICATION forming part of Letters Patent No. 284,343, dated September 4, 1883.

Application filed February 26, 1883. (No model.) Patented in England April 1, 1882, No. 1,587, May 11, 1882, No. 2,263, and November 24, 1882, No. 5,601, and in France September 30, 1882, No. 151,323, and November 13, 1882, No. 152,067.

*To all whom it may concern:*

Be it known that I, ALFRED TRIBE, a subject of the Queen of Great Britain, and residing at Denbigh Road, Notting-Hill, county of Middlesex, England, have invented certain Improvements in Secondary Batteries, (for which I have obtained patents in Great Britain, No. 1,587, dated April 1, 1882, No. 2,263, dated May 11, 1882, and No. 5,601, dated November 24, 1882, and in France, No. 151,323, dated September 30, 1882, and for which I have made applications in Germany, dated October 6, 1882, Austria, dated October 6, 1882, and France, dated November 13, 1882,) of which the following is a specification.

This invention relates to the construction of the plates or elements of secondary galvanic batteries.

It consists, first, in the employment for the negative plate or element of a couple or cell of a grooved frame of non-conducting material, a conductor therein, and a filling of lead peroxide or other oxide or compound of lead in the form of a plate set in said frame.

It consists, secondly, in making the conductors of negative plates or elements, such as above described, or the foundation plates or supports, (when such are used,) or the conductors of other elements, of lead which has been converted to a greater or less degree into sulphide, arsenide, oxide, phosphide, or other compound of an electro-negative character. Ordinarily the supporting or foundation plates or conductors, being of lead, are electro-positive to the active material in contact therewith, and local circuits are set up, which cause loss of the energy stored and the destruction of the said plates or conductors. By the present invention the portion of the conductor in contact with the active material is itself electro-negative, or more nearly in the same position in the electro-chemical scale as the active material, and the difficulties arising from local action are thus to a large extent, if not entirely, avoided. Preferably, the conductor is only surfaced with the electro-negative compound, the interior being metallic.

The invention consists, thirdly, in the employment for the positive plate or element of a couple or cell of a grooved frame of conducting material, or of non-conducting material when combined with a conductor. This frame contains the active material in the form of a plate of reduced or porous lead.

The invention also comprises the combination, with each other, of negative and positive elements constructed as above indicated. In charging, the negative elements are connected with the positive terminal or pole of the charging-circuit and the positive elements with the negative pole or terminal.

The following is a description of the manner in which the invention is or may be carried into effect, reference being had to the accompanying drawings, which form a part of this specification.

Figure 1 is a side view of the frame and conductor of a negative element without the filling of active material. Fig. 2 is a partial view of the same in horizontal section. Fig. 3 illustrates, in section through one side, three forms of grooved frame for a positive element; and Fig. 4 is a partial view in horizontal section of a cell of secondary battery constructed in accordance with the invention.

For the negative plates or elements a rectangular frame, C, of wood, slate, porcelain, or other non-conducting substance not readily acted upon by the exciting solution or electrolyte (dilute sulphuric acid) is employed. It is grooved on the inside, and in the groove is placed the conductor D, of lead, superficially coated with sulphide or other electro-negative compound of lead. The conductor may be of other material—as, for example, of lead alone, or of lead or copper electroplated with gold or platinum; but the former is preferred. It is shown in the form of a rod or strip extending around three sides of the frame; but it can be of other forms, and may pass entirely around the frame, or simply down one or both sides. Where it passes out of the groove through the exciting liquid or electrolyte, (the upper surface of which is indicated by the dotted line A, Fig. 1,) the conductor is protected with insulating material B, such as india-rubber or gutta-percha. The material which is to form the active part of the element is preferably peroxide of lead or minium, or mixtures of them; but other lead compounds or mixtures of two or more compounds may be used—as, for example, minium or peroxide of lead in admixture with other oxides of lead, or with the sulphate of lead, or with mixtures of oxide and sulphate of lead. This material is or may be made into paste of the proper consistency with water, or, by preference, dilute sulphuric acid, and having been placed in the frame and in contact with the conductor, the plate or element may be laid aside for it to harden. Instead of proceeding in this way, the material may be compressed and the compressed sheet set in the frame, and a paste of other material (like or unlike that which has been compressed) applied thereon. The plate or element thus prepared is placed in an envelope or wrapper of porous material—such as felt, flannel, calico, asbestus, cloth, and the like. The incased plate, when pure peroxide has not been employed in its construction has the active material converted into peroxide by electrical action.

To surface the leaden conductor with sulphide of lead it may be heated in contact with molten sulphide; or it may be treated with a solution of sulphide and heated; or it may be exposed, when heated, to the vapor of sulphur. Instead, however, of forming a surface layer of lead sulphide on the lead conductor, the latter may be made of a compound formed by melting sulphur and lead together, and be cast or otherwise made into the desired shape. The conductors formed of such compound may have their surfaces further sulphurized, as above described, if desired. Instead of sulphurizing the conductor, it may be provided with a coating of oxide by converting the surface metal into oxide by electrolysis, and then subjecting the coating to friction or pressure. These operations are or may be repeated until no further oxidation takes place. The conductor may also be rendered electro-negative by converting the lead comprising it into phosphide or arsenide. These substances may be added to the molten metal in proper proportion, and the product cast into the required form. These methods are given by way of example. It is not intended to limit the invention to them. They are applicable as well to the foundation plates or support of elements (when these are used) as to other conductors, the object in all cases being, as before stated, to convert the metal to a greater or less extent into an electro-negative compound, so as to prevent local action. The conductor D is supposed to have been prepared or surfaced before being placed in the grooved frame.

In the construction of the positive plates or elements the operations above described for the manufacture of the negative plates or elements may be followed, only it is not necessary to protect the leaden conductor, either by conversion into an electro-negative compound or by coating with insulating material, and the oxide or compound forming the active part of the plate or element is reduced to metallic lead instead of being peroxidized. Instead of being of non-conducting material, the frame may be made of any suitable conducting material, but preferably of lead, the material (lead compound or mixture of lead compounds) being placed therein, as described, for the non-conducting frame, and the conductor D being, if desired, omitted. When the frame is conducting, it has preferably a cross-section of one of the forms shown in Fig. 3. The positive plate or element may be employed with or without a supporting wrapper or case. In both plates or elements the grooved frame forms a part of the plate or element, and its use is essentially different from that of a containing-vessel having grooves made in its sides to separate the elements or plates and retain them in an upright position.

In Fig. 4 two pairs of positive and negative elements are shown assembled. The negative elements (which in charging are connected with the positive pole of the generator, and from which the current in discharging proceeds) consist each of a non-conductive grooved frame, C, inclosing a conductor, D, of lead coated with a layer of lead sulphide, a sheet, F, of compressed peroxide of lead, and a coating, G, of red lead or other suitable compound of lead applied to each face of the plate, and a wrapper, H, of felt. The conductor D is laid in the groove of frame C, as shown in Fig. 1, and the sheet of peroxide is then placed in position, being filled—say in a moist, pulverulent, or granular form—into the frame, supported on a suitable bed, and then compressed, so that it is forced into the groove, and constitutes a self-sustaining sheet or filling. The red lead G is or may be applied in the form of a paste or mortar with a spatula or trowel. The positive elements consist of a grooved lead frame, E, a mass, I, of reduced lead filling said frame, and a felt wrapper, K. The elements are separated from each other by strips L, of rubber, as common in the art. They are arranged in alternation, (positive following a negative, and vice versa,) and the elements of like name are connected with the same binding-post or exterior conductor. M is the containing-vessel, of ordinary or suitable non-conducting material. It is obvious that the elements of either name could be modified, as before indicated.

Having now fully described the said invention and the manner of carrying the same into effect, what I claim is—

1. A negative element or plate for secondary batteries, comprising, in combination, a grooved non-conducting frame forming a part of said element or plate, a conductor placed in said frame, and a filling of electro-negative compound of lead, substantially as described.

2. In a negative element or plate for secondary batteries comprising active material—such as lead oxide in contact with a conductor—a conductor composed, where it is in contact with said electro-negative active material, of an electro-negative compound of lead, such as hereinbefore recited.

3. A positive element or plate comprising a grooved frame forming part of said element or plate, in combination with a plate of lead set in said frame, substantially as described.

4. In a cell of secondary battery, one or more negative elements consisting each of a grooved frame of non-conducting material, a conductor therein, and a filling of lead compound, in combination with one or more positive plates consisting each of a grooved frame and a plate of lead set therein, said frames forming each a part of the corresponding element or plate, substantially as described.

In testimony whereof I have signed my name to this specification in the presence of two subscribing witnesses.

ALFRED TRIBE.

Witnesses:
   CHAS. JAS. JONES,
      47 *Lincoln's Inn Fields, London.*
   WM. JOHN WEEKS,
      31 *Lombard Street, London.*